United States Patent [19]

Ruch et al.

[11] 4,091,174

[45] May 23, 1978

[54] ELECTROCHEMICAL BATTERY

[75] Inventors: Jean Ruch; Dieter Hasenauer, both of Brilon, Germany

[73] Assignee: Accumulatorenwerk Hoppecke Carl Zoellner & Sohn, Cologne, Germany

[21] Appl. No.: 768,046

[22] Filed: Feb. 14, 1977

[30] Foreign Application Priority Data

Feb. 25, 1976 Germany .............................. 2607519

[51] Int. Cl.² ........................................... H01M 8/22
[52] U.S. Cl. ................................................... 429/27
[58] Field of Search ............................. 429/27, 51, 68

[56] References Cited

U.S. PATENT DOCUMENTS

| | | | |
|---|---|---|---|
| 3,043,898 | 7/1962 | Miller et al. | 429/27 |
| 3,730,776 | 5/1973 | Geisler | 429/51 |
| 3,855,000 | 12/1974 | Jammet | 429/27 |
| 3,920,476 | 11/1975 | Black | 429/68 |

Primary Examiner—John H. Mack
Assistant Examiner—H. A. Feeley
Attorney, Agent, or Firm—Martin A. Farber

[57] ABSTRACT

A device for production of high outputs and efficiencies with high current densities in an electrochemical system, particularly a metal - air cell, comprising a consumable electrode, an air electrode, an electrolyte disposed in an electrolyte space and current take-off. The consumable electrode has a rod-shape spacial form made at least partially of compact metal, the consumable electrode having a front face constituting a sole working surface and projects sealed in the electrolyte space. An air electrode is spaced by the smallest distance parallel to the working surface of the consumable electrode, and an adjustable mounting for one of the electrodes, particularly the consumable electrode, uniformly maintains the spacing between the electrodes in the axial direction.

28 Claims, 6 Drawing Figures

Fig.2
Fig.3
Fig.4
Fig.5
Fig.6
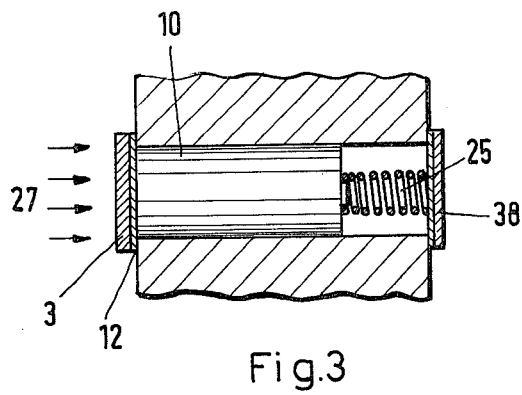
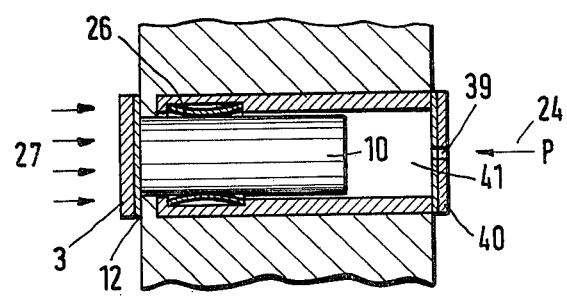
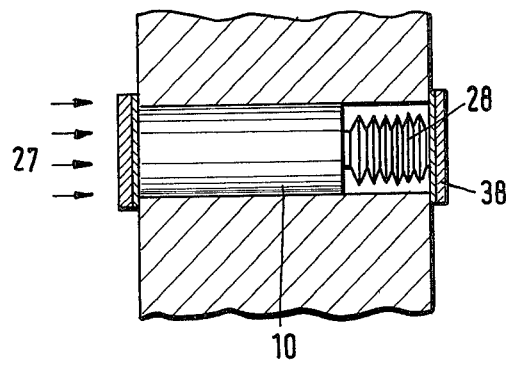
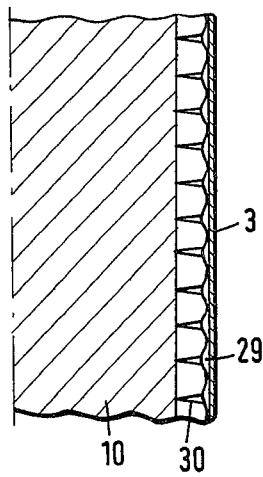
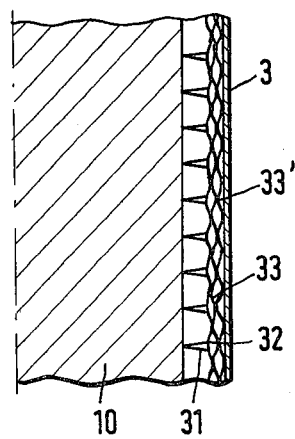

a smaller free cross-section with respect to the air electrode cross-section such that a contacting holder or retention edge range arises, and the air electrode carrier and the carrier of the consumable electrode are fastened to each other. In this manner on the one hand a very simple contacting can be established and on the other hand a very compact cell, which is formed small, can be constructed. In advantageous manner, between the air electrode and the air electrode carrier there is arranged a support grating which serves the purpose of avoiding adhesion of the air electrode on the support, The air electrode support can be formed with a recess opening toward the inside, preferably in the shape of a circular surface, which forms a gas space, whereby between the air electrode and the air electrode support or the support grating, there is arranged a seal. By this embodiment the air electrode on its one side points to the electrolyte and on its other side points to this gas space so that the best possible utilization of the theretical output and efficiency of the air electrode can be achieved with longer working life.

In accordance with the apparatus of the present invention, a pushing of the consumable electrode is provided. The force which is necessary for the pushing can be applied by mechanical, hydraulic or pneumatic means, for example, by gas pressure, spring pressure or a winding or screw adjustment device. Also the pushing of the electrode is possible by gravitational force or electro - mechanical operations.

According to a particularly preferred embodiment of the device according to the invention, the consumable electrode is inserted or penetrates in a surrounding or enveloping jacket which is substantially in the form of a cartridge, whereby — adjusted to the comsumption — the electrode is pushed from out of the cartridge. The exchange of the consumable electrode takes place by a simple replacement of a cartridge, the advantage also being protection of the electrodes.

Instead of a replacement of the consumable electrodes with the mechanical charging, also a continuous guidance or follow-up of the electrode can be provided by known connection methods of a new electrode on the newly consumed electrode, for example for fastening with screws, or clipping or fastening with needles or conducting adhesive.

A further basic concept of the invention resides in the maintaining of an optimum (small) spacing of the electrodes, which can be held the same or equal in a simpler manner by distance holders or range spacers arranged between the electrodes, on which the adjustable electrode is pressed thereagainst. Preferably as range spacers, a synthetic material grating or needle-formed pins can be used. Also the adjustment of the spacing can be provided by a pressurized system: e.g., electrolyte pressure/follow-up pressure.

The contacting of the air electrode has already been described above. For the current removal from the consumable electrode it is proposed to use an electrically conducting seal by which the current on the periphery of the electrodes can be taken off. Depending on the embodiment form of the cell, however, also other current removal means can be provided, for example by slip ring or collector ring contact or by the application or attachment of a flexible electrical conductor to the rear side of the consumable electrode.

It is particularly advantageous to provide the consumable electrode with a corrosion protection on the surfaces which are not bathed by the electrolyte. This can be provided, for example, by coating the consumable electrode with corrosion resistant materials, particularly by electroplating, metal-coating, cladding or plating, lacquering, painting or dip coating by immersion. Advantageous in this manner are coatings with materials, which likewise are decomposed or disintegrated with the consumption of the electrode, for example lacquers or varnishes, which without support through the metal of the electrodes are washed away by the electrolyte.

The consumable electrodes should be formed rod-shaped. In addition a rod shape is preferred, which has a good sealable small cross-sectional circumference, particularly circular-shaped, rounded-off quadratic or square, or rounded-off hexagonally. The consumable electrode has a rod shape if its length is greater than its diameter. Depending upon the purpose of use, also a relatively small length of the consumable electrode can be of advantage.

With the above and other objects and advantages in view, the present invention will become more clearly understood from the following detailed description of preferred embodiments of the present invention when considered with the accompanying drawings, which schematically illustrate metal - air cells according to the invention, of which:

FIG. 2 is a side view of a device for the adjustment of the consumable electrode in schematic illustration;

FIG. 3 is a similar view of another adjustment device;

FIG. 4 is a similar view of a varied embodiment of an adjustment device;

FIG. 5 is a sectional view partially broken-away of a range spacer or distance holder; and FIG. 6 is a modified embodiment of a distance holder.

Figure 1:
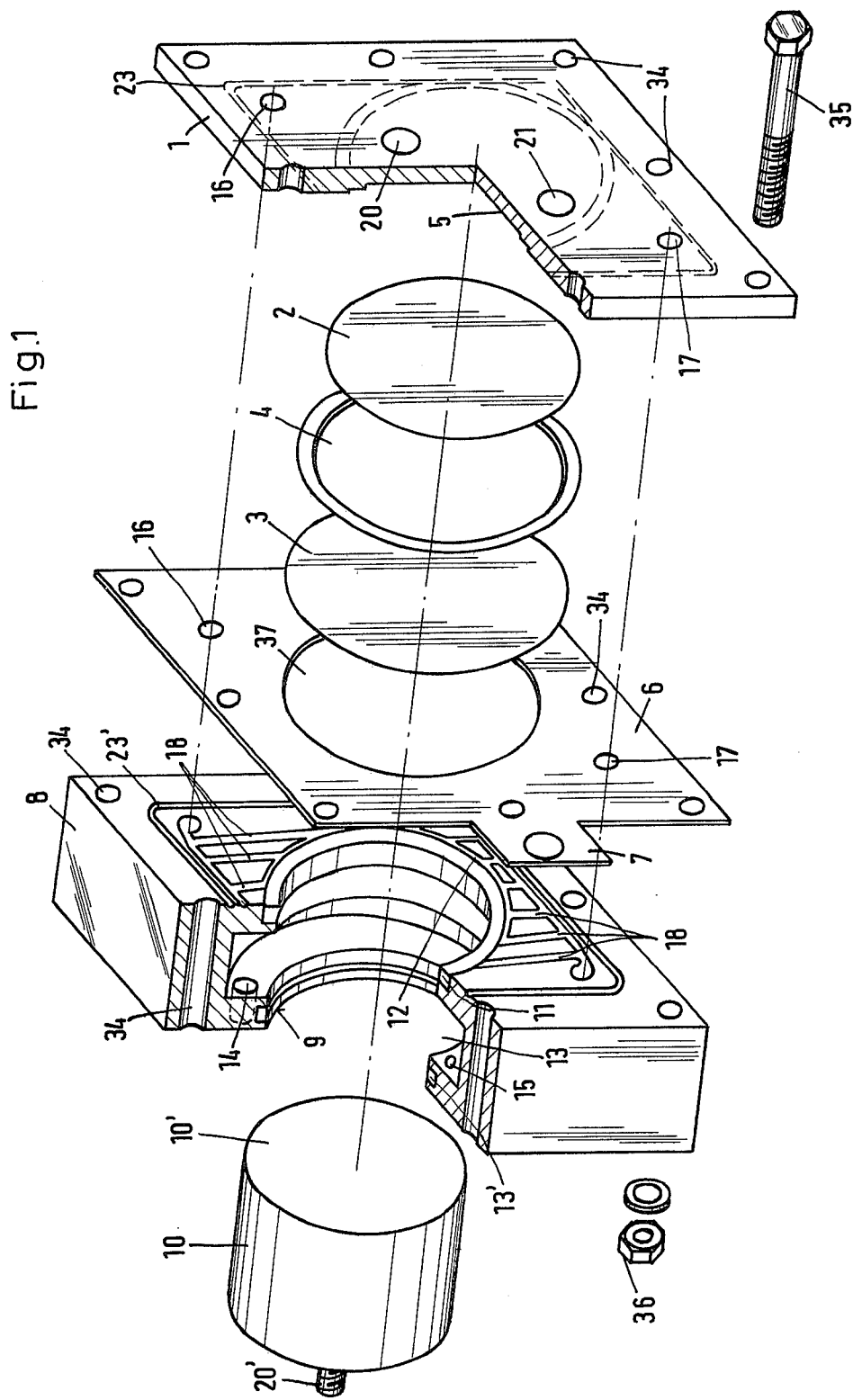
FIG. 1 is a perspective exploded view of a metal - air cell dismounted and partly broken away in section.

Referring now to the drawings and more particularly to FIG. 1, the metal - air cell illustrated therein has on one side an end plate 1 of quadratic or square shape, which is made of acrylic resin.

The end plate 1 is formed with eight bores through which screw bolts 35 are guidable therein, which produce the connection of the individual parts of the cells to one another with cooperating nuts 34.

On the inside in the end plate 1 there is positioned a seal 23 (schematically illustrated in the drawing), which encircles connection bores or canals 17, 16, a feed bore 20 and a removal bore 21, the latter being arranged inside of a recess 5, which forms the gas space of an air electrode 3. Between the air electrode 3 and the end plate 1 a support grate 2 is arranged with the insertion of an annular seal 4, which support grate is made of synthetic material and prevents the adherence of the oxygen electrode 3 to the end plate 1, the latter constituting the air electrode support. The annular seal 4 prevents the entrance of electrolyte liquid in the gas space or region 5. It may be seen from the drawings that for its holding, a graduation or step-off is provided in the inner surface of the end plate 1 at the transition to the gas region or space 5.

The oxygen electrode 3 substantially comprises a porous carrier for an active paste in the form of a thin plate with a circular-shaped periphery. A current removal member 6 which is made of metal is adjusted to this shape, which member 6 centrally is formed with a circular recess 37, which member further however is quadratic or square as is the end plate 1. The circular recess 37 has a smaller diameter than that of the oxygen

ELECTROCHEMICAL BATTERY

The present invention relates to a device for production of high outputs or efficiencies with high current densities in an electrochemical system, particularly a metal - air cell, comprising a comsumable electrode, an air electrode, an electrolyte disposed in an electrolyte space and a current take-off. Under the term "air electrode" of course also oxygen electrodes or $H_2O_2$ electrodes are included. The term "air electrode" is only used for the sake of simplicity and not in a limiting sense.

For example an electrochemical battery of the above type is known from US Pat. No. 3,788,899, by which there are provided devices for the volumetric variation of the eletrolytes or the control of the current density on the surfaces of the anodes and the surfaces of the cathodes, the devices being namely for the variable adjustment of the electrolyte level. This known metal - air cell is mechanically chargeable, that is the consumable electrode may be replaced by a new one. It is disadvantageous that a plurality of moveable parts must exist in order to be able to bring about the volumetric variation of the electrolyte and the adjustment of the electrolyte level in the cell, respectively. These moveable parts are controlled in a complicated manner. It is further disadvantageous that for exchange of the plate-shaped consumable electrode after its consumption, the entire cell must be dismantled and again must be put together. Difficulty of the known electrochemical batteries resides in that only low current densities can be maintained, which lie at approximately $50 mA/cm^2$. Beyond this the duration of the maintainable current density is narrowly limited. One calculates an energy content of approximately 200Wh/kg. By the larger and larger increasing spacing between the electrodes during operation the cell resistances and losses are increased, whereby the withdrawable outputs or efficiencies are reduced. Also losses occur by the penetration of the plate-shaped electrodes into the electrolyte since the course of the current flow lines between the electrodes is poor. This disadvantage is true above all for plates which are made of sintered material by which practically only the visable surface with higher current densities is exposed to the current flow lines.

It is a task and object of the present invention to obtain a device for production of higher outputs and efficiencies with higher current densities and for a long time, which does not have the above-mentioned disadvantages, and in which particularly the spacing of the electrodes can be maintained small, thus to avoid the enlarging spacing of the electrodes during operation in the devices of the state of the art, and in which the mechanical charging takes place in a simple manner. Particularly the invention is based on the object and task to produce a metal - air cell, the high output and efficiency thereof being maintainable with higher current densities over a predeterminable long time.

It is another object of the present invention to aid the solution of the above-mentioned task and object, in the manner that the consumable electrode has a rod-shaped spacial form at least partially of compact or dense metal, the front surface of which alone constitutes the working surface and projects sealed in the electrolyte space, the air electrode being arranged at the smallest possible distance parallel to the working surface and the distance is maintained uniformly in the axial direction by means of an adjustable or regulatable disposition or mounting of one of the electrodes, particularly of the consumable electrode. It is guaranteed by the invention that comparatively high efficiencies and outputs with high current densities are obtained in a simpler manner over a predeterminable long time, since the apparatus is technically simple, comprises a small number of parts, consumable electrodes made of compact or dense metal can be used, the working surface of which can be held comparatively small, whereby a mechanical charging can be performed by means of the adjustable or controllable disposition of the consumable electrode, which is designed completely uncomplicated. The term "compact" is used in demarcation to the known porous, sintered, powder-formed electrodes, whereby in advantageous embodiment of the present invention, the consumable electrode has a cylindrical spacial form and is a metal-solid body, whereby the sealing of the one front surface relative to the electrolyte space, which one front surface forms the working surface, is achieved by means of a seal which substantially snugly and compactly encloses the front surface. The consumable electrode advantageously can be made of aluminum, magnesium, zinc or alloys thereof. In the manner that the working surface of the consumable electrode is arranged parallel and coaxially, with the smallest possible spacing, relative to the air electrode and only the working surface is passed-around or surrounded by the electrolyte by means of the provided seal, the best conditions and assumptions for the production of higher outputs and efficiencies with higher current densities are produced, since the most favorable current line course and the lowest losses are guaranteed. The seal should protect each surface of the consumable electrode which does not face opposite the air electrode from the electrolyte.

According to a preferred embodiment of the invention, the consumable electrode is held in a carrier, the latter being formed with a recess extending through the carrier surrounding the electrode sealed on its end which points toward the electrolyte space, and on the inside is formed with one or a plurality of channels for the uniform bathing of the working surface with electrolyte. In this manner the electrolyte feed and electrolyte removal with respect to the electrolyte space between the electrodes can be carried out through the electrode carrier in the form of bores or canals (16, 17), which preferably are connected to the electrolyte - distribution channel(s). It is of advantage to provide a device for the tempering of the consumable electrode, for which, advantageously, the carrier is formed with an annular space opening toward the recess, which annular space is fillable via connection channels with a tempering medium. In addition to the possibility of tempering with the described embodiment, the guiding of the electrolyte is advantageous in order to insure a uniform bathing of the working surface of the consumable electrode as well as the air electrode. In this manner the reaction products are quickly carried away. During the flowing of the electrolytes through the gap between the electrodes by means of the forced guiding of the electrolytes in the canals, the removal of the reaction products from the working range is favorably performed. In this manner additionally the voltage drop in the electrolyte can be maintained small, which is particularly recommendable with the high achieved current densities. The air electrode can be held on a plate-shaped air electrode carrier or support (1) by a current removal member, the latter having a recess with electrode 3, so that a contacting retention edge range arises therefor. The current removal member 6 in the design or shape of the end plate 1 is provided in a corresponding manner with bores 34 for the insertion of the screw bolts 35 as well as with a connection bore 16 and a connection bore 17 and further has a contact lug 7 for the securing of an electrical conductor.

The metal - air cell or battery has a consumable electrode 10 which is held in a carrier plate 8. The carrier plate 8 is made of an acrylic resin synthetic material and is adjusted in its quadratic or square design to the end plate 1 and is provided as the latter with bores 34 for the passage of the screw 35. A bore 9 runs centrally through the carrier plate 8, in which the consumable electrode 10 is inserted in the operative or active condition. In the wall of the bore there are imbedded, respectively, on the inner side and on the outer side both a seal 11 and 13', respectively, of which the seal 11 seals off the electrolyte space toward the outside. The seal 11 has a conically extending inner surface in order to form a sharp or high-definition sealing edge toward the electrolyte space, which lip-like tightly surrounds the consumable electrode 10. The seal 11 is made of a material which is not attacked or not corroded by the electrolyte.

In the wall of the bore 9, between the seals 11 and 13', there is formed a hollow space 13 in the form of an annular region which opens and communicates with the bore 9, and which annular region is fillable with a tempering medium via connection channels 14 and 15.

In the inner surface, that is the surface of the carrier plate 8 which points to the oxygen electrode 3, the connection bores or canals 16 and 17 flow into blind holes or pocket holes, to which there are connected distribution channels 18 for the electrolyte. The distribution channels comprise branches of side-cut canels which are connected with one another and which are distributed uniformly about the bore 9, which guarantee a uniform distribution and flow of the electrolyte to the electrode surface 10'. The electrode face 10' is the sole working surface of the consumable electrode 10, which is arranged at a close distance parallel to the oxygen electrode 3.

The consumable electrode 10 has a connection lug 20' to which an electrical conductor can be connected for taking off the current.

The feed and removal bores 20 and 21, respectively, which communicate into the gas space 5 serve for conducting the oxygen 27 or oxygen containing fuel (FIGS. 2-4).

It is to be recognized that the consumable electrode 10 is pushable in the carrier plate 8 for the purpose of maintaining a uniform spacing of the electrodes. However the special device for this pushing is not shown in FIG. 1 for clarity.

In the described metal - air cell, the sealing of the electrode space is guaranteed by the seal 23 in the inner surface of the end plate 1 and by a seal 23' in the inner surface of the carrier plate 8. Referring now to the drawings and particularly to FIGS. 2, 3 and 4, possible follow-ups and contactings of the consumable electrode 10 are schematically illustrated. According to FIG. 2 the follow-up and contacting takes place by means of a spring 25, which extends between an abutment plate 38 and the consumable electrode 10. To the left in the figure by means of the arrows, the feeding of oxygen 27 to the oxygen electrode 3 is indicated. Further the electrode space 12 between the two electrodes is schematically indicated with hatching. To this electrode space 12 there is fed an electrolyte in a not illustrated manner from a tank through canals and is returned to the tank through an electrolyte return conduit. As a consequence of this there occurs a constantly controlled flow through of electrolyte through the electrolyte space 12, for which a pump is provided in the supply system (not illustrated).

According to FIG. 3 of the drawings, the follow-up of the consumable electrode 10 takes place by a gaseous or liquid medium 24 with a pressure P which is fed through a bore 39 of a connection plate 40 to a closed space 41 behind the consumable electrode. The strength of the pressure and consequently of the feed can be controlled. The contacting takes place in this embodiment by means of a sliding or rubbing contact 26.

According to FIG. 4 the follow-up of the consumable electrode 10 takes place by an elastomer 28 which is arranged in pretensioned condition between the rear front surface of the consumable electrode and the abutment plate 38.

Referring now to the drawings and more particularly to FIG. 5, the holding of the spacing between the consumable electrode 10 and the oxygen electrode 3 can be provided by non-conducting needles 30 which are welded on a net or grating 29 of synthetic material. This net or grating 29 with needles 30 is secured between the two electrodes and guarantees that the consumable electrode 10, which is pushably mounted, is always arranged at a uniform spacing from and relative to the oxygen electrode 3 and consequently the best possible efficiencies can be obtained with high current densities.

Another spacer holder is illustrated in FIG. 6 of the drawings, whereby between the consumable electrode 10 and the oxygen electrode 3, there are arranged electrically conducting needles 31, which are welded to a metal net or grid 32. The grid 32 is supported on additional gratings 33 and 33', whereby for insulation, the grating 33 is made of a non-conducting material.

We claim:

1. A device for production of high outputs with high current densities in an electrochemical system, particularly a metal - air cell, comprising a consumable electrode.

an air electrode spaced from said consumable electrode with electrolyte disposed in an electrolyte space defined therebetween, means for taking-off current from one of said electrodes, said consumable electrode having a rod-shaped spacial form made of a compact metal at least in part and constituting a metallic solid body, said consumable electrode having a front face constituting a sole working surface and projecting sealed in the electrolyte space, means for sealing said front face of said consumable electrode relative to the electrolyte space, said sealing means constitutes a seal substantially flushly surrounding the periphery of said front face, said air electrode disposed directly axially spaced opposite from said front face of said consumable electrode by a smallest distance parallel to the working surface of said consumable electrode, and means for axially adjustably displaceably mounting only one of said electrodes for maintaining the spacing between said electrodes constant with a predetermined axial spacing.

2. The device as set forth in claim 1, wherein the consumable electrode is made of a material selected from the group consisting of aluminum, magnesium, zinc and alloys thereof.

3. The device as set forth in claim 1, wherein said consumable electrode has a cylindrical spacial form.

4. The device according to claim 3, wherein said sealing means further for protecting and preventing each surface of said consumable electrode which does not face opposite to said air electrode from contact with the electrolyte.

5. The device according to claim 1, further comprising
a carrier formed with a bore passing therethrough,
said sealing means sealing said bore on an end of said carrier pointing and adjacent to the electrolyte space,
said consumable electrode is adjustably inserted in said bore which surrounds the latter with said carrier thereby holding said consumable electrode,
said carrier is formed at said end with an inner side surface substantially coplanar to said working surface of said consumable electrode with at least one distribution channel means for uniformly bathing said working surface with electrolyte.

6. The device as set forth in claim 5, further comprising
means cooperating with said said carrier for operatively supporting said electrode, said air electrode supporting means has bore means therethrough for feeding and removing the electrolyte to and from the electrolyte space between said electrodes, and
said at least one electrolyte distribution channel means communicates with said bore means.

7. The device as set forth in claim 1, further comprising means for tempering said consumable electrode.

8. The device as set forth in claim 5, wherein
said carrier is formed with an annular space communicating with said bore,
another sealing said bore on the other end of said carrier, both of said sealing means engage said consumable electrode and seal off said annular space,
connection channels communicate with the annular space and are adapted to fill the latter with a tempering medium.

9. The device of claim 6, wherein
said air electrode supporting means has a shape of a plate,
a current removal member operatively holds said air electrode on said air electrode supporting means,
said current removal member is formed with a recess therethrough having an open cross-section smaller than the cross-section of said air electrode defining an overlapping contacting retention edge range abutting against a peripheral edge portion of said air electrode, and
means for securing said air electrode supporting means and said carrier of said consumable electrode to one another with said current removal member therebetween.

10. The device as set forth in claim 9, further comprising
a support grating arranged between said air electrode and said air electrode supporting means.

11. The device as set forth in claim 10, wherein said air electrode supporting means has a stepped graduation forming an inwardly facing second recess facing toward and communicating with said air electrode and of circular shape, constituting an oxygen gas space, and
an annular seal operatively disposed between said air electrode abutting adjacent a peripheral portion thereof and said air electrode supporting means at said stepped graduation,
a feed bore and a removal bore formed in said air electrode supporting means communicate with said second recess,
a second seal engages said current removal member and said air electrode supporting means and is spaced from and around said annular seal defining an electrolyte communicating space, said bore means communicates with said electrolyte communicating space,
means for peripherally sealing said carrier of said consumable electrode with respect to said current removal member, and
said current removal member is formed with holes therethrough communicating said oxygen gas space with said electrolyte space.

12. The device as set forth in claim 11, further comprising means for axially displacing said consumable electrode.

13. The device as set forth in claim 12, wherein said displacing means constitutes mechanical means.

14. The device as set forth in claim 12, wherein said displacing means constitutes a pneumatic means.

15. The device as set forth in claim 12, wherein said displacing means constitutes a hydraulic means.

16. The device as set forth in claim 1, further comprising
a jacket constituting a cartridge enveloping said consumable electrode, the latter being displaceably mounted therein.

17. The device as set forth in claim 1, further comprising
at least one spacer means between said electrodes for holding the spacing between said electrodes constant.

18. The device as set forth in claim 17, wherein said at least one spacer means constitutes a synthetic material grating.

19. The apparatus as set forth in claim 17, wherein said at least one spacer means comprises needle-like pins.

20. The device as set forth in claim 1, further comprising
an electrical conducting seal means for tapping-off current from said consumable electrode.

21. The device as set forth in claim 1, further comprising
means for protecting said consumable electrode against corrosion.

22. The device as set forth in claim 1, wherein said consumable electrode is formed with a cross-sectional peripheral shape having good sealability and being small.

23. The device as set forth in claim 22, wherein the cross-sectional peripheral shape of said consumable electrode is circular.

24. The device as set forth in claim 22, wherein the cross-sectional peripheral shape of said consumable electrode is square.

25. The device as set forth in claim 22, wherein the cross-sectional peripheral shape of said consumable electrode is hexagonal.

26. A one-way metal-air cell as set forth in claim 1, wherein the ratio of length to diameter of said consumable electrode, constituting a metal electrode, is held small and provided with smaller diameter.

27. The device as set forth in claim 1, wherein said means for adjusting mounting, displaceably mounts said consumable electrode.

28. The device as set forth in claim 11, wherein
said distribution channel means comprises recessed channels in communication with one another formed in said inner side surface of said carrier, said recessed channels include an annular recessed channel adjacent said bore, said first-mentioned sealing means and a peripheral edge of said working surface of said consumable electrode,
said first-mentioned sealing means has a conically extending inner surface defining a sharp sealing edge toward the electrolyte space lip-like tightly surrounding said consumable electrode adjacent said working surface,
said current removal member is a flat member pressed against said inner side surface of said carrier, said distribution channel means include blind holes connected at an end of said recessed channels and aligned with said bore means in said air electrode supporting means and with said holes in said current removal member.

* * * * *

UNITED STATES PATENT AND TRADEMARK OFFICE
CERTIFICATE OF CORRECTION

PATENT NO. : 4,091,174
DATED : May 23, 1978
INVENTOR(S) : US Patent - Dr. Jean Ruch, et al It is certified that error appears in the above-identified patent and that said Letters Patent are hereby corrected as shown below:

COLUMN 7, line 29, claim 6, delete "said" (second occurrence)

COLUMN 7, line 41, claim 8, after "sealing" insert --means sealing--

COLUMN 9, line 7, claim 26 after "with" insert --a--

Signed and Sealed this

Seventeenth Day of October 1978

[SEAL]

Attest:

RUTH C. MASON
Attesting Officer

DONALD W. BANNER
Commissioner of Patents and Trademarks